US011308478B2

United States Patent
Jin et al.

(10) Patent No.: US 11,308,478 B2
(45) Date of Patent: Apr. 19, 2022

(54) MID-RANGE READER INTERACTIONS

(71) Applicant: Visa International Service Association, San Francisco, CA (US)

(72) Inventors: Jing Jin, Burlingame, CA (US); Thomas Bellenger, San Mateo, CA (US); Christian Aabye, Foster City, CA (US); Bryan Carroll, Redwood City, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 433 days.

(21) Appl. No.: 15/451,148

(22) Filed: Mar. 6, 2017

(65) Prior Publication Data

US 2017/0255922 A1    Sep. 7, 2017

Related U.S. Application Data

(60) Provisional application No. 62/303,986, filed on Mar. 4, 2016.

(51) Int. Cl.
*G06Q 20/32* (2012.01)
*G06Q 20/40* (2012.01)

(52) U.S. Cl.
CPC ......... *G06Q 20/327* (2013.01); *G06Q 20/325* (2013.01); *G06Q 20/3224* (2013.01);
(Continued)

(58) Field of Classification Search
CPC ............. G06Q 20/327; G06Q 20/3224; G06Q 20/3226; G06Q 20/325; G06Q 20/3278; G06Q 20/405

See application file for complete search history.

(56) References Cited

U.S. PATENT DOCUMENTS 9,420,403 B1 * 8/2016 Annan .................. H04W 4/80
9,483,887 B1 * 11/2016 Soleimani .......... G07C 9/00571
(Continued)

FOREIGN PATENT DOCUMENTS

WO   2016007445 A1   1/2016
WO   2016030893 A2   3/2016

OTHER PUBLICATIONS

Supplementary European Search Report, dated Jan. 9, 2019, in EP Application No. 17760993.0, 8 pages.
(Continued)

*Primary Examiner* — John W Hayes
*Assistant Examiner* — Ari Shahabi
(74) *Attorney, Agent, or Firm* — Kilpatrick Townsend & Stockton LLP

(57) ABSTRACT

A reader device may include a midrange wireless transceiver, a controller coupled to the midrange wireless transceiver, and a memory coupled to the controller. The memory may store executable code, which when executed by the controller, causes the reader device to implement various operations including maintaining a transaction service attributes database in the memory. The operations may also include broadcasting a beacon including a transaction service indicator at a periodic interval using the midrange wireless transceiver, receiving a connection request from a communication device, and establishing a wireless connection with the communication device. The operations may further include performing an application selection process with the communication device, performing application data processing with the communication device, and performing authorization request processing for the communication device.

20 Claims, 8 Drawing Sheets

(52) U.S. Cl.
CPC ..... *G06Q 20/3226* (2013.01); *G06Q 20/3278* (2013.01); *G06Q 20/405* (2013.01)

(56) References Cited

U.S. PATENT DOCUMENTS

| | | | |
|---|---|---|---|
| 2015/0051993 A1 | 2/2015 | Moshfeghi | |
| 2015/0106196 A1 | 4/2015 | Williams et al. | |
| 2015/0221149 A1 | 8/2015 | Main et al. | |
| 2015/0373762 A1* | 12/2015 | Raj | H04W 76/14 |
| | | | 370/329 |
| 2016/0012413 A1 | 1/2016 | Chitilian et al. | |
| 2016/0057619 A1* | 2/2016 | Lopez | G06Q 20/3227 |
| | | | 380/247 |

OTHER PUBLICATIONS

International Search Report and Written Opinion, dated Jun. 15, 2017, in PCT Application PCT/US2017/020985, 15 pages.
KR Application No. 10-2018-7028399, Office Action dated Jan. 25, 2021, 97 pages.
AU2017228450, "First Examination Report", dated Jan. 28, 2021, 5 pages.
Application No. CN201780014602.4, Office Action, dated Jan. 29, 2021, 17 pages.
AU2017228450, "Notice of Acceptance", May 26, 2021, 3 pages.
Application No. KR10-2018-7028399, Notice of Decision to Grant, dated May 20, 2021, 3 pages.
Application No. CN201780014602.4, Office Action, dated Jul. 26, 2021, 14 pages.
Application No. EP17760993.0, Office Action, dated Oct. 5, 2021, 5 pages.
Application No. KR10-2021-7026151, Office Action, dated Sep. 29, 2021, 5 pages.

* cited by examiner

MID-RANGE READER INTERACTIONS

CROSS-REFERENCES TO RELATED APPLICATIONS

The present application claims priority to U.S. Provisional Application No. 62/303,986, filed on Mar. 4, 2016, which is herein incorporated by reference in its entirety for all purposes.

BACKGROUND OF THE INVENTION

Proximity communication technologies such as near field communications (NFC) have enabled devices to communicate with one another when the devices are placed in close proximity to each other. One application of such proximity communication technologies is to provide interactions between a user's portable communication device (e.g., a mobile device) and an access terminal. For example, a user can placed the communication device in proximity to the access terminal, and the communication device can transmit account credentials to the access terminal to request access to a service, an item, or a restricted area, etc. The access terminal may then verify the account credentials, and grant the user access to the subject of the request.

A drawback of proximity communication technologies is the limited communication range. For example, NFC cannot effectively transmit and receive data beyond a range of about 20 centimeters. As a result, a proximity reader has to be placed at a location within a user's reach to allow a user to put his or her portable communication device next to the proximity reader. This often means that the proximity reader is placed next to or integrated with an access terminal. Furthermore, because a proximity reader is often required to be next to or integrated with an access terminal, it is not practical for a proximity reader to be shared amongst multiple access terminals. Another drawback of proximity communication technologies is the limited amount of data that can be transmitted between devices during each transmission, and the inability to maintain a connection once the portable communication device is moved away from the proximity reader. As a result, it may not be practical to transmit a large amount of data over NFC limiting the amount of value-added services that can be provided.

Longer range communication technologies such as WiFi can be used to circumvent some of these drawbacks of proximity communication technologies. However, because multiple users can connect to the same WiFi network at a time, communications over WiFi are more susceptible to interception by unauthorized parties eavesdropping on the network. Furthermore, the ability for multiple users to connect to the same network makes WiFi unsuitable for use with access terminals at a retail location, because it can be difficult to determine which communication device on the shared WiFi network belongs to which user interacting with a particular access terminal.

Embodiments of the present invention address these and other problems individually and collectively.

BRIEF SUMMARY

According to some embodiments, a reader device may include a midrange wireless transceiver, a controller coupled to the midrange wireless transceiver, and a memory coupled to the controller. The memory may store executable code, which when executed by the controller, causes the reader device to implement various operations including maintaining a transaction service attributes database in the memory. The transaction service attributes database may store a set of transaction service characteristics and associated characteristic identifiers. The operations may also include broadcasting a beacon including a transaction service indicator at a periodic interval using the midrange wireless transceiver, receiving a connection request from a communication device, and establishing a wireless connection with the communication device. The operations may further include performing an application selection process with the communication device by updating a selected application identifier characteristic in the transaction service attributes database based on file control information received from the communication device, performing application data processing with the communication device by updating the transaction service attributes database with application data received from the communication device, and performing authorization request processing for the communication device by generating an authorization request message based on application data characteristics in the transaction service attributes database.

According to some embodiments, a reader device may interact with a communication device by maintaining a transaction service attributes database in a memory of the reader device. The transaction service attributes database may store a set of transaction service characteristics and associated characteristic identifiers. The reader device may broadcast a beacon at a periodic interval using a midrange wireless transceiver, the beacon including a transaction service indicator. The reader device may receive a connection request from a communication device; and establish a wireless connection with the communication device. The reader device may further perform an application selection process with the communication device by updating a selected application identifier characteristic in the transaction service attributes database based on file control information received from the communication device, perform application data processing with the communication device by updating the transaction service attributes database with application data received from the communication device, and performing authorization request processing for the communication device by generating an authorization request message based on application data characteristics in the transaction service attributes database.

DETAILED DESCRIPTION

Figure 1:
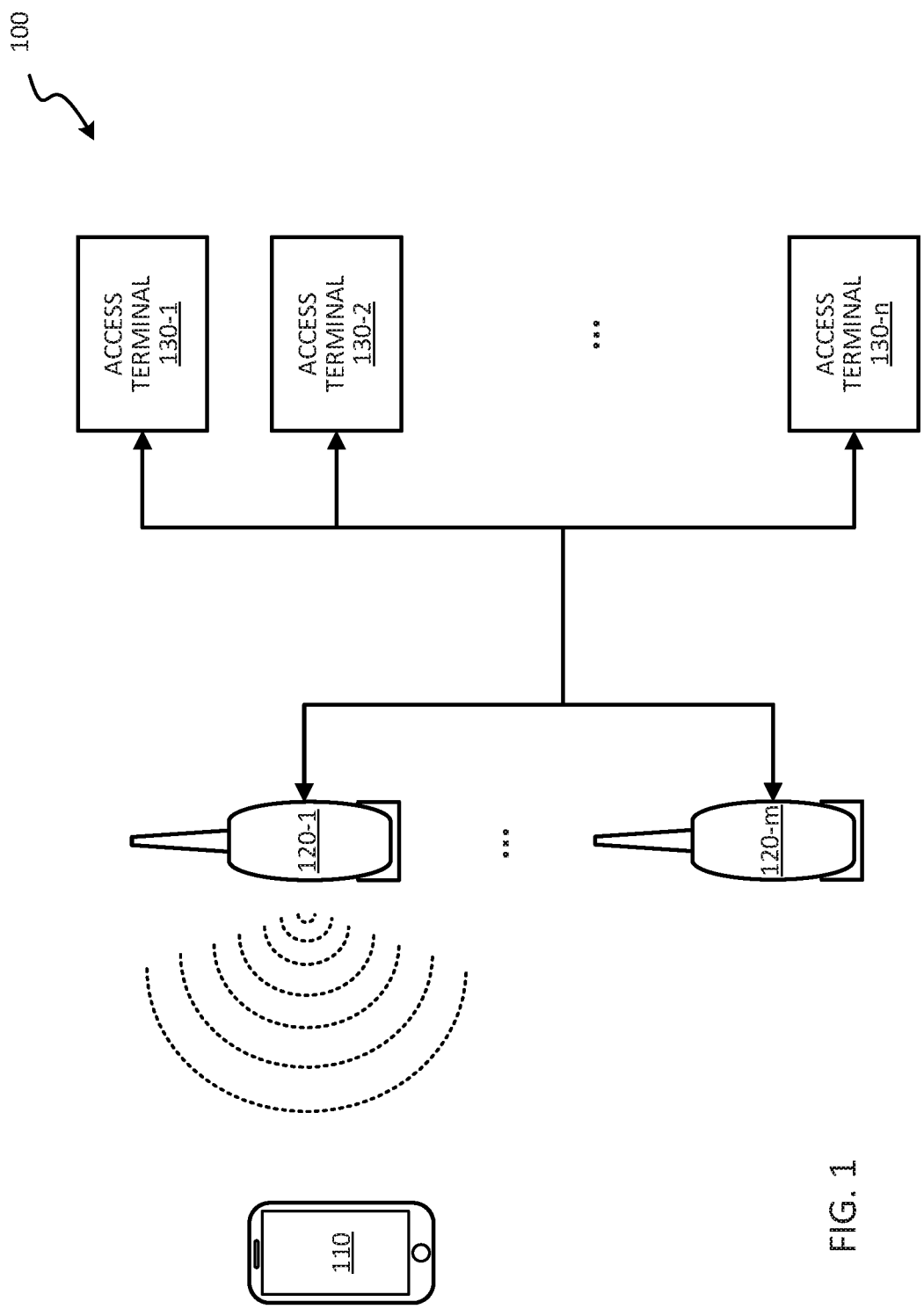
FIG. 1 illustrates a midrange wireless communication system, according to some embodiments

Embodiments of the present invention provide techniques for device interactions using midrange wireless communications, and more specifically, for device interactions between a user's communication device and an access terminal. As compared to proximity implementations such as Near Field Communication (NFC), the extended range of midrange wireless communication technologies such as Bluetooth and Bluetooth Low Energy allows greater flexibility in the placement of midrange wireless reader devices because the reader device no longer has to be placed within a user's reach. This flexibility in the placement of midrange wireless reader devices also allows a midrange wireless reader device to be shared amongst multiple access terminals. Furthermore, the extended range of midrange wireless communication technologies also provides a more robust connection that can be used to transmit a greater amount of data to enable a host of value-added services that may otherwise be impractical when using NFC. As compared to longer range wireless communication implementations such as WiFi, the midrange wireless communication techniques as described herein can be more secure because only one communication device can be connected to a midrange wireless reader device at a time, making it unlikely for an unauthorized device to have access to the midrange wireless reader device at the same time to eavesdrop on the communications being sent between the user's communication device and the midrange wireless reader device. The one-to-one correspondence between a user's communication device and a midrange wireless reader device also makes the midrange wireless communication techniques as described herein suitable for use with access terminals at a retail location.

Prior to discussing embodiments of the invention, description of some terms may be helpful in understanding embodiments of the invention.

"Wireless communication technology" may refer to a communication technology that can be used to pair two communication devices together such that the two communication devices can exchange information wirelessly. In some embodiments, "midrange" may refer to a medium range of distance that a signal from a wireless transceiver may reach. For example, the range of a midrange wireless transceiver may be less than a hundred meters. Examples of midrange wireless communication technologies may include Bluetooth, Bluetooth Low Energy (BLE), ZigBee, or other suitable protocols for communicating over midrange distances.

A "communication device" may be a device that includes one or more electronic components (e.g., an integrated chip) that can communicate with another device. A portable communication device may be one form of a communication device that can be transported and operated by a user. A portable communication device may provide remote communication capabilities to a network, and can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable device (e.g., smart watch, health monitoring device, etc.), electronic reader device, etc., or in the form of a card (e.g., smart card) or a fob, etc. Examples of portable communication devices may also include portable computing devices (e.g., laptop, netbook, ultrabook, etc.). In some embodiments, a portable communication device may also be in the form of a vehicle that can be operated by a user to transport the user. The vehicle may be equipped with communication and/or network connectivity capabilities. For example, a vehicle may include an automobile such as car or motorcycle that is equipped with a wireless transceiver. In some embodiments, a communication device can be communicatively coupled to another communication device (e.g., a mobile device) and act as an accessory to that communication device to extend the functionalities of that communication device. Examples of a communication device that may act as an accessory communicatively coupled to a mobile device such as a smart phone may include a wearable device, a vehicle, etc. In some embodiments, a mobile device such as a smart phone can also act as an accessory to another mobile device such as a portable computer. Other examples of a communication device may include connected or smart devices such as home automation devices and smart appliances, etc.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, a server computer can be located remotely from a device communicating with the server computer, and the remote server computer may be referred to as the "cloud."

A "token" may be a substitute for sensitive information. A token may refer to information that can be transmitted or use in place of the sensitive information. For example, a token can be a substitute for sensitive information such as a real account identifier, and the token may be used in place of the real account identifier to conduct access the account. In the payment context, a payment token may be an identifier for a payment account and act as a substitute for the real account identifier (e.g., a primary account number (PAN)). A token may include a series of alphanumeric characters that may be used as a substitute for an original account identifier. For example, a token "4900 0000 0000 0001" may be used in place of a primary account number (PAN) "4147 0900 0000 1234." In some embodiments, a token may be format preserving and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token can be generated in a manner such that the recovery of the original sensitive information (e.g., PAN) may not be algorithmically or computationally derived. For example, a token may include random numbers so that the PAN associated with the token is not computationally derivable from the token. A lookup table may be used to associate a PAN and a corresponding token. In some embodiments, a token can be a non-payment token that is used as a substitute for other types of sensitive information.

An "issuer" may typically refer to a business entity (e.g., a bank) that maintains an account (e.g., a financial account) for a user. The account can be enrolled in an application installed on a communication device of the user to allow the user to conduct transactions on the account via the communication device. A "merchant" may typically be an entity that engages in transactions and can sell goods or services, or provide access to goods or services. An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or transaction processing network (e.g., payment processing network), and for interacting with a consumer communication device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from, or associated with, a consumer communication device. In some embodiments, where an access device may comprise a Point-of-Sale (POS) terminal, any suitable POS terminal may be used and may include a reader, a processor, and a computer-readable medium. For example, exemplary readers can include radio frequency (RF) antennas, optical scanners, bar code readers, or magnetic stripe readers to interact with a consumer communication device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline— transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

"Provisioning" may include a process of providing data for use. For example, provisioning may include providing, delivering, or enabling a token and/or a key on a communication device. Provisioning may be completed by any entity within or external to the transaction system. For example, in some embodiments, tokens may be provisioned by an issuer or a transaction processing network onto a mobile device. The provisioned tokens may have corresponding token data stored and maintained in a token vault or token registry. In some embodiments, a token vault or token registry may generate a token that may then be provisioned or delivered to a device. In some embodiments, an issuer may specify a token range from which token generation and provisioning can occur. Further, in some embodiments, an issuer may generate and notify a token vault of a token value and provide the token record information (e.g., token attributes) for storage in the token vault.

A "user" may include an individual or a consumer that operates a communication device to conduct a transaction on an account or otherwise manage an account. The consumer may also be referred to as a cardholder, accountholder, or user. The term "consumer" may be used interchangeably with the term "user."

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account. Examples of a dynamic account parameter may include a limited-use key that is used as an encryption key to generate transaction cryptograms. Examples of a semi-static account parameter may include a token that is a substitute for a real account identifier.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. In some embodiments, a key may be a limited-use key (LUK) that is subject to one or more limited-use thresholds to limit the usage of the LUK, which once exceeded, the LUK is no longer valid, and further usage of the LUK may require replenishment or renewal of the LUK.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

A "limited-use threshold" may refer to a condition that limits the usage of a piece of information. A limited-use threshold may be exceeded or exhausted when the underlying condition is met. For example, a limited-use threshold may include a time-to-live that indicates an amount of time for which a piece of information is valid, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

The term "authentication" and its derivatives may refer to a process by which the credential of an endpoint (including but not limited to applications, people, devices, processes, and systems) can be verified to ensure that the endpoint is who they are declared to be.

A "transaction processing network" may include a network of one or more devices that can process and route transaction request messages. An exemplary transaction processing network may include data processing subsystems, networks, and operations used to support and deliver authorization services, exception file services, transaction scoring services, and clearing and settlement services. An exemplary transaction processing network may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Details of various embodiments of the present invention will now be described.

FIG. 1 illustrates a midrange wireless communication system 100, according to some embodiments. Midrange wireless communication system 100 can be a transaction system that is located, for example, at a merchant location. Midrange wireless communication system 100 may include one or more midrange wireless reader devices 120-1 to 120-m communicatively coupled to one or more access terminals 130-1 to 130-n. In some embodiments, the number of midrange wireless reader devices and the number of access terminals in the system can be the same, or the number of midrange wireless reader devices can be less than the number of access terminals such that a midrange wireless reader device can be shared amongst multiple access terminals. In some embodiments, a midrange wireless reader device can also be integrated as part of an access terminal.

Any of the midrange wireless reader devices 120-1 to 120-m may communicate with a user's communication device 110 that comes within the range of the corresponding reader device using a midrange wireless communication technology such as Bluetooth, Bluetooth Low Energy (BLE), or other suitable midrange wireless communication technologies. In some embodiments, each of the midrange wireless reader devices 120-1 to 120-m may transmit or broadcast a beacon detectable by communication device 110 to advertise the presence and services of the corresponding midrange wireless reader device. For example, the beacon can be transmitted at a periodic interval, and may include one or more service indicators associated with one or more services (e.g., a transaction service) that the midrange wireless reader device can provide to the communication device 110. In some embodiments, a service indicator can be in the form of a universally unique identifier (UUID) associated with the particular service. Upon communication device 110 detecting a beacon with a recognizable service indicator, the communication device 110 may establish a connection with the midrange wireless reader device to exchange information such as transaction information or account credentials. The account credentials received by a midrange wireless reader device can be provided to an access terminal to request authorization for the transaction. In some embodiments, the midrange wireless reader device can take on the role of a server that maintains data and information that a device taking on the role of a client (e.g., communication device 110) can discover, read, write, and obtain indications and notifications of.

According to some embodiments, the midrange wireless communication system 100 can be used in a multi-lane scenario where there are multiple purchase lanes or stations at a merchant location. Each lane or station can be equipped with a midrange wireless reader device that is integrated with or communicatively coupled to a access terminal such that the number of midrange wireless reader devices and the number of access terminals in the system are the same. A user can establish a connection between his or her communication device to the midrange wireless reader device in a specific lane or station in order to conduct a transaction. In such scenarios, multiple midrange wireless reader device can advertise their presences at the same time, but each midrange wireless reader device may have a distinctive descriptor that uniquely identifies the midrange wireless reader device In other words, each of the midrange wireless reader devices can concurrently perform a process of broadcasting a periodic beacon, but each reader device would have a device name that uniquely identifies the corresponding midrange wireless reader device. A user can then select the appropriate midrange wireless reader device base on the unique device name to connect to, and proceed with the transaction. An example of a multi-lane scenario can be a supermarket with multiple checkout lanes.

According to some embodiments, the midrange wireless communication system 100 can be used in a pool scenario where the number of midrange wireless reader devices is less than the number of access terminals. A user can connect his or her communication device to any of the available midrange wireless reader devices to perform a transaction. In such scenarios, the midrange wireless reader devices do not need to have any distinctive descriptor that uniquely identifies the particular midrange wireless reader device. As such, the device name of each midrange wireless reader device in the system can be the same as any of the other midrange wireless reader devices. For example, the device name of every midrange wireless reader device in the system can simply be the merchant name. In order to avoid confusion as to which midrange wireless reader device to connect to, a limited number (e.g., only one) of the midrange wireless reader devices may advertise or transmit a beacon at a time. When one advertising midrange wireless reader device establishes a connection to a communication device, another midrange wireless reader device can start advertising to ensure that there is always a midrange wireless reader device available. In other words, only one midrange wireless reader device in the system may broadcast the beacon with the transaction service indicator at a time, and other midrange wireless reader devices in the system do not broadcast a beacon until after the midrange wireless reader device broadcasting the beacon has established a wireless connection with a user's communication device. An example of a pool scenario is a movie theater with multiple midrange wireless reader device enabled stations for consumers to purchase tickets from.

Figure 2:
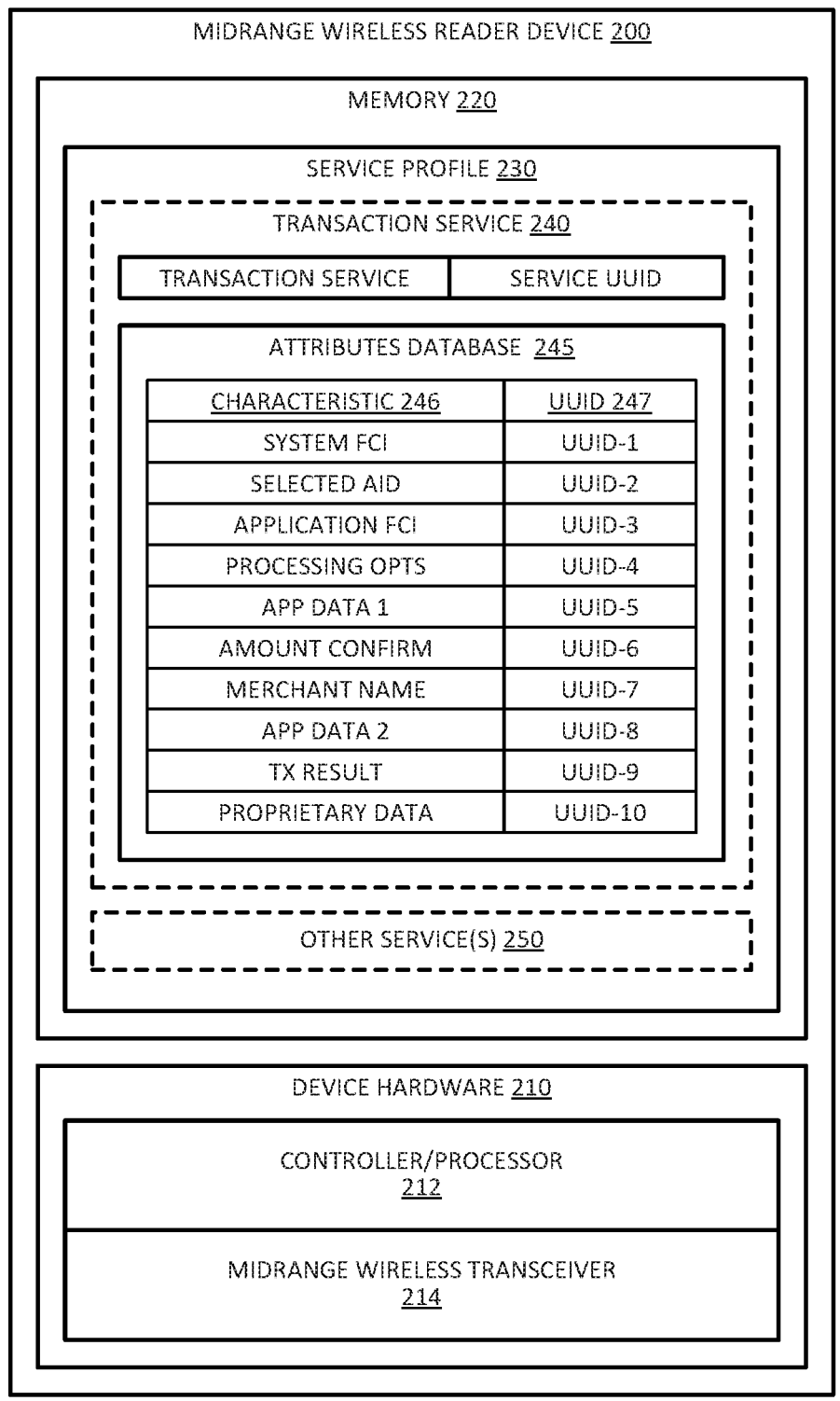
FIG. 2 illustrates a block diagram of a midrange wireless reader device, accordingly to some embodiments.

FIG. 2 illustrates a block diagram of a midrange wireless reader device 200, accordingly to some embodiments. Midrange wireless reader device 200 may include device hardware 210 coupled to a memory 220. Device hardware 210 may include a controller (or a processor) 212 and a midrange wireless transceiver 214. Midrange wireless transceiver 214 may include one or more RF transceiver circuits to send and receive data using a midrange wireless communication technology such as Bluetooth or Bluetooth Low Energy. Controller 212 can be implemented as one or more integrated circuits (e.g., one or more single core or multicore microprocessors and/or microcontrollers), and is used to control the operation of midrange wireless reader device 200. Controller 212 can execute program code or computer-readable code stored in memory 220 to implement services provided by midrange wireless reader device 200 and to facilitate communications with external devices.

Memory 220 can be a non-transitory computer readable storage medium implemented using any combination of any number of non-volatile memories (e.g., flash memory) and/or volatile memories (e.g., DRAM, SRAM), or any other computer readable storage medium, or a combination thereof media. Memory 220 may store a service profile 230 that includes information about one or more services provided by midrange wireless transceiver 214. For example, service profile 230 may include information for a transaction service 240 supported by midrange wireless reader device 200 and any number of other services 250 such as value-added services.

According to some embodiments, each service supported by midrange wireless reader device 200 is associated with a service indicator (e.g., a UUID) that can be included in a broadcasted beacon to advertise the service to nearby devices. Each service can also be associated with a service attributes database maintained by midrange wireless reader device 200. Each service attributes database may store a set of service characteristics associated with the particular service and characteristics identifiers that act as a handle to access the service characteristics stored in the service attributes database.

By way of example, transaction service 240 can be associated with a transaction service indicator such as a transaction service UUID. The beacon transmitted by midrange wireless reader device 200 to notify nearby devices of the presence of midrange wireless reader device 200 may include this transaction service indicator to inform nearby devices of the transaction service supported by midrange wireless reader device 200. Midrange wireless reader device 200 may maintain a transaction service attributes database 245 that stores a set of transaction service characteristics 246 and associated characteristic identifiers 247. The characteristic identifier for a particular transaction service characteristic can be in the form of a UUID, and can be used as a handle for an external device communicating with midrange wireless reader device 200 to access (e.g., read/write) the particular transaction service characteristic stored in the transaction service attributes database 245. Examples of transaction service characteristics 246 may include system file control information, selected application identifier (AID), application file control information, processing options, first application data, amount confirmation, merchant name, second application data, transaction result, and proprietary data. With the exception of the merchant name which remains fixed, the values of the transaction service characteristics are transient and are updated during each transaction being conducted with a user's communication device. A user's communication device interacting with midrange wireless reader device 200 may write to a particular transaction service characteristic using its associated characteristic identifier, and a transaction service characteristic updated by midrange wireless reader device 200 can be notified to the user's communication device. After each successful or unsuccessful transaction, the values of the transient transaction service characteristics in the transaction service attributes database 245 can be purged and restored to default or reset values.

According to some embodiments, because midrange wireless communication technology allows a user's communication device to maintain connectivity with midrange wireless reader device 200 over a longer distance, midrange wireless reader device 200 can exchange a greater amount of data with the user's communication device, and can provide additional services during a transaction being conducted with a user's communication device that may otherwise be unavailable with a proximity reader (e.g., a NFC reader). For example, the additional services 250 supported by midrange wireless reader device 200 may include an error message service, itemized billing service, loyalty service, e-receipt service, etc. As with the transaction service, each of these additional services may have its own service indicator (e.g., UUID) that can be included in a beacon to advertise the availability of such a service, and each of these additional services may have their own service attributes database to store a set of service characteristics and corresponding characteristic identifiers that are associated with the particular service.

For example, the service characteristics for the error message service may include characteristics to communicate error messages for an unsuccessful transaction such as a select AID error message characteristic, a processing error message characteristic, and a transaction confirmation error message characteristic. The service characteristics for the itemized billing service may include characteristics associated with an item that is the subject of the transaction such as an item identifier, item price, item description, item category, item discount, item promotion, item quantity, total discount, total items, amount authorized, sales tax, and transaction currency code, etc. The service characteristics for the loyalty service may include a loyalty template characteristic that can be used to communicate information such as merchant proprietary value-added service (VAS) data, consumer loyalty account identifier, phone number, partner loyalty account identifier, email address, offers, order confirmation number, ZIP code, etc. The service characteristics for the e-receipt service may include an e-receipt characteristic to communicate e-receipt information to a user's communication device.

Figure 3:
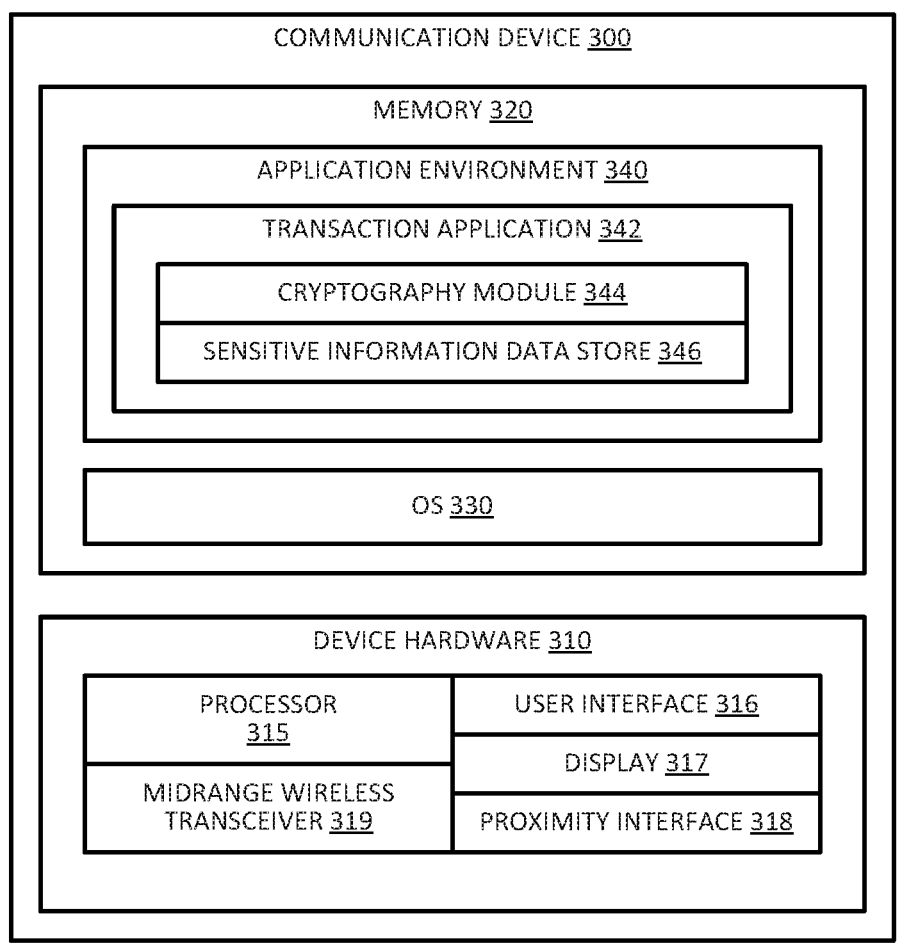
FIG. 3 illustrates a block diagram of a communication device, according to some embodiments.

FIG. 3 illustrates a block diagram of a communication device 300, according to some embodiments. Communication device 300 (e.g., a mobile device) may include device hardware 310 coupled to a memory 320. Device hardware 310 may include a processor 315, a midrange wireless transceiver 319, use interface 316, a display screen 317 (which may be part of user interface 316), and an optional proximity/contactless interface 318. Processor 315 can be implemented as one or more integrated circuits (e.g., one or more single core or multicore microprocessors and/or microcontrollers), and is used to control the operation of communication device 300. Processor 315 can execute a variety of programs in response to program code or computer-readable code stored in memory 320, and can maintain multiple concurrently executing programs or processes. Midrange wireless transceiver 319 can be used by communication device 300 to communicate with other devices and/or to connect with external networks using a midrange wireless communication technology such as Bluetooth, Bluetooth Low Energy, etc. User interface 316 can include any combination of input and output elements to allow a user to interact with and invoke the functionalities of communication device 300.

Memory 320 can be a non-transitory computer readable storage medium implemented using any combination of any number of non-volatile memories (e.g., flash memory) and volatile memories (e.g., DRAM, SRAM), or any other computer readable storage medium, or a combination thereof media. Memory 320 may store an operating system (OS) 330 and an application environment 340 where one or more applications to be executed by processor 315 reside. For example, application environment 340 may host a transaction application 342 that communication device 300 uses to conduct transactions. Transaction application 342 may include a sensitive information data store 346 to store sensitive information such as account credentials (e.g., account identifier, token that can be used as a substitute for an account identifier, etc.) and cryptographic keys. In some embodiments, the account credentials stored in sensitive information data store 346 are provisioned by an issuer or a transaction processing network host. Transaction application 342 may also include a cryptography module 344 that can be used to generate a transaction cryptogram during a transaction. For example, cryptography module 344 may generate a transaction cryptogram by encrypting transaction information associated with a transaction using a key provisioned to transaction application 342. The transaction cryptogram can be provided to a midrange wireless reader device, and the transaction cryptogram can be forwarded to an access terminal to obtain authorization for the transaction. In some embodiments, application environment 340 may host more than one transaction applications, and a list of available transaction applications can be provided to a midrange wireless reader device to allow the midrange wireless reader device to select a particular transaction application to conduct the transaction with.

Figure 4:
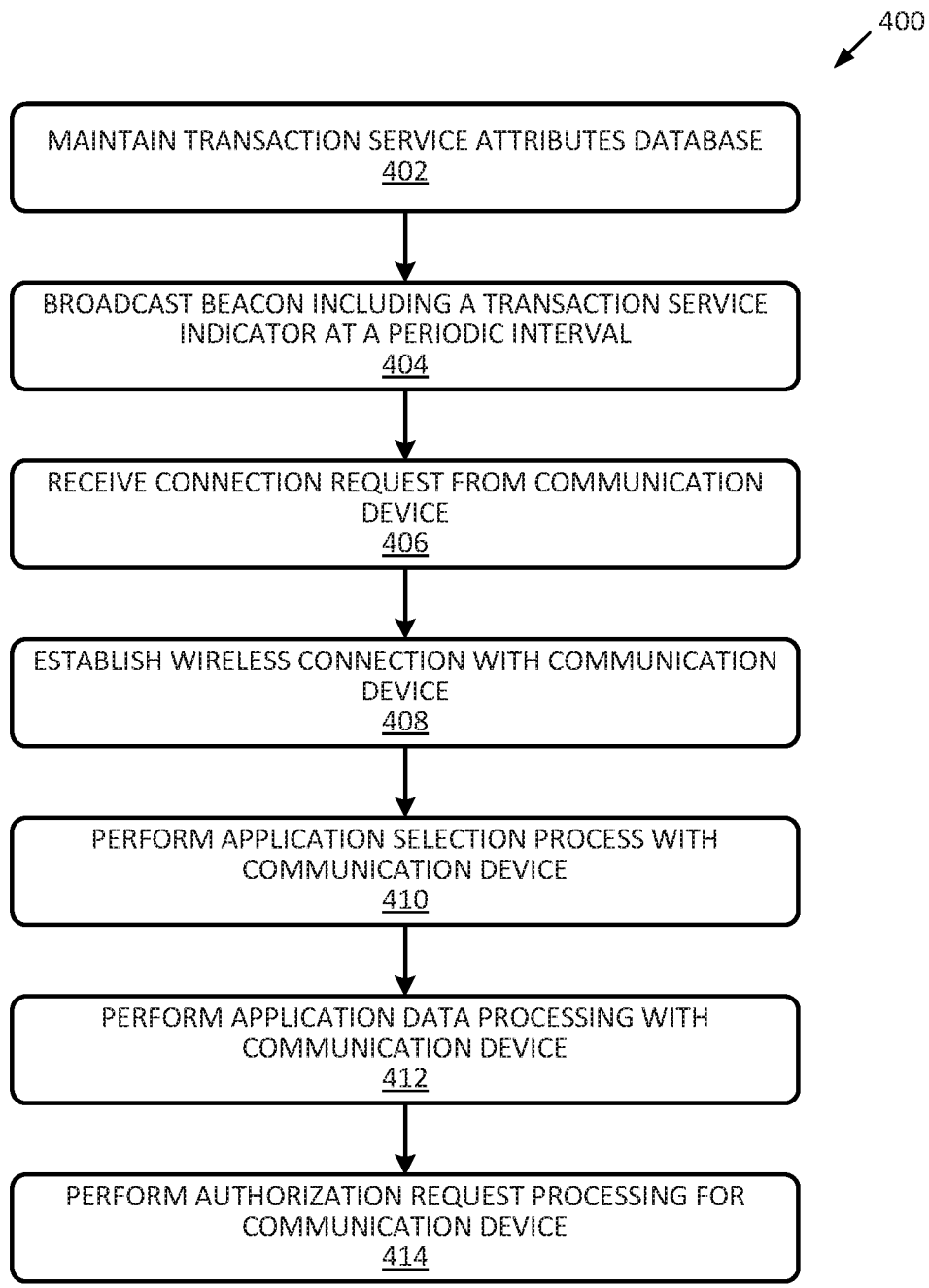
FIG. 4 illustrates a process performed by a midrange wireless reader device for interacting with a communication device during a transaction, according to some embodiments

FIG. 4 illustrates a process 400 performed by a midrange wireless reader device for interacting with a user's communication device during a transaction, according to some embodiments. At block 402, the midrange wireless reader device maintains a transaction service attributes database in the memory of the midrange wireless reader device. The transaction service attributes database may store a set of transaction service characteristics and associated characteristic identifiers for a transaction service provided by the midrange wireless reader device. The transaction service characteristics may include system file control information, selected application identifier (AID), application file control information, processing options, first application data, amount confirmation, merchant name, second application data, transaction result, and optional proprietary data, etc. Transaction service characteristics that can be written by a user's communication device interacting with midrange wireless reader device may include the system file control information, application file control information, first application data, and second application data characteristics. Transaction service characteristics that are updated by the midrange wireless reader device may include selected application identifier (AID), processing options, amount confirmation, transaction result, and optional proprietary data characteristics. When the midrange wireless reader device updates any of these transaction service characteristics, the midrange wireless reader device may notify the user's communication device interacting with midrange wireless reader device to read the updated characteristic from the transaction service attributes database.

At block 404, the midrange wireless reader device may broadcast a beacon using the midrange wireless transceiver. For example, the beacon can be broadcasted using Bluetooth, Bluetooth Low Energy, or other similar communication technologies. The beacon may include a transaction service indicator such as a transaction service UUID to advertise the transaction service capability of the midrange wireless reader device. In some embodiments, the beacon can be transmitted at a periodic interval (e.g., once every 20 ms). When a user's communication device detects the beacon advertising a recognizable transaction service indicator, the communication device may send a scan response request to the midrange wireless reader device to obtain additional device information from the midrange wireless reader device. Upon receiving the scan response request from the communication device, the midrange wireless reader device may send scan response data back to the communication device. The scan response data may include a device name of the midrange wireless reader device that the communication device can use to establish a communication channel with the midrange wireless reader device. For a multi-lane scenario (e.g., when the number of midrange wireless reader devices and the number of access terminals in the system are the same), the device name of the midrange wireless reader device will be different than the device name of any of the other midrange wireless reader devices in the system, because the midrange wireless reader devices in the system can concurrently broadcasting a periodic beacon and the communication device would need a way to uniquely identify a particular midrange wireless reader device. For a pool scenario (e.g., when the number of midrange wireless reader devices is less than the number of access terminals in the system), the device name can the same for each of the plurality of reader devices in the system, because only one midrange wireless reader device may be broadcasting the beacon at a time.

At block 406, the midrange wireless reader device may receive a connection request from the communication device. The connection request may include the device name of the midrange wireless reader device as provided in the scan response data. At block 408, the midrange wireless reader device may establish a wireless connection with the communication device. The wireless connection can be used as a communication channel for the communication device to access the transaction service attributes database stored in the memory of the midrange wireless reader device. In some embodiments, pairing of the communication device with the midrange wireless reader device may also include establish a set of one or more encryption keys that is used to encrypt the data and information exchanges between the devices.

Figure 5:
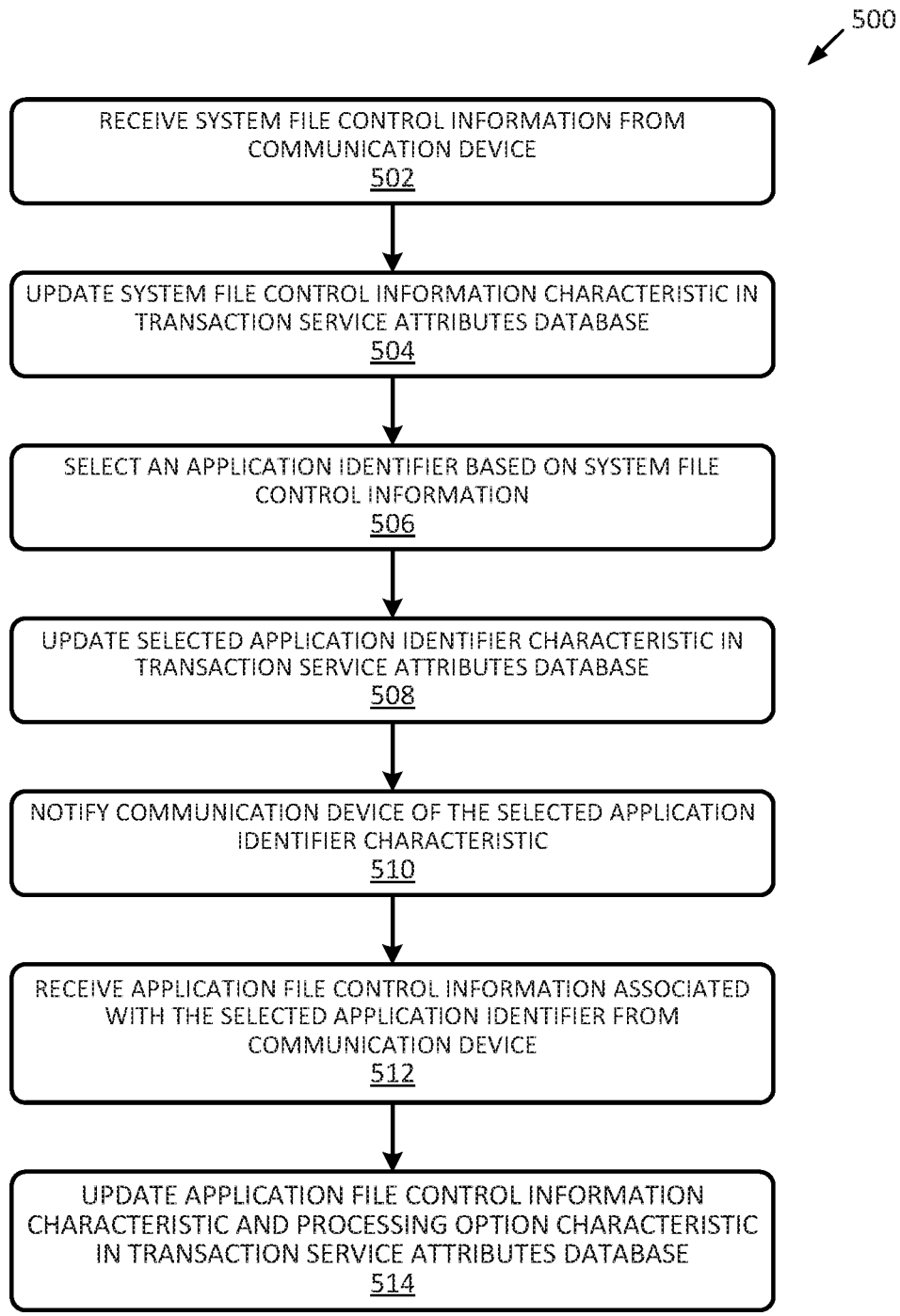
FIG. 5 illustrates a flow diagram of an example application selection process, according to some embodiments.

At block 410, the midrange wireless reader device may perform an application selection process with the communication device to select a proper transaction application installed on the communication device to conduct the transaction. The application selection process may involve updating a selected application identifier characteristic in the transaction service attributes database based on file control information received from the communication device. FIG. 5 illustrates a flow diagram of an example application selection process 500, according to some embodiments.

Referring to FIG. 5, the application selection process 500 may begin by the midrange wireless reader device receiving system file control information from the communication device to be written into the transaction service attributes database at block 502. The system file control information may include a directory of transaction applications available on the communication device. For example, system file control information may include a directory entry for each transaction application, and each directory entry may include an application identifier (AID) corresponding to the transaction application, an application label (e.g., mnemonic associated with the AID), and an application priority indicator indicating the priority of the corresponding transaction application.

At block 504, the midrange wireless reader device may update the system file control information characteristic in the transaction service attributes database based on the received system file control information. For example, the system file control information characteristic in the transaction service attributes database can be updated with the list of directory entries received from the communication device.

At block 506, the midrange wireless reader device selects an application identifier based on the system file control information. The midrange wireless reader device may parse the directory entries in the system file control information. For each entry, the midrange wireless reader device may determine if the AID matches an AID supported by the midrange wireless reader device. If the AID matches (e.g., in full or partially), the AID can be added to an application candidate list. The midrange wireless reader device may then determine the highest priority application from the candidate list, and select the corresponding AID. At block 508, the midrange wireless reader device updates the selected application identifier characteristic in the transaction service attributes database with the selected AID.

At block 510, the midrange wireless reader device may notify the communication device of the update to the selected application identifier characteristic in the transaction service attributes database, and provide the communication device with the selected AID from the transaction service attributes database. The communication device can then send application file control information associated with the selected AID to the midrange wireless reader device. The application file control information may include a list of data objects that the communication device requests from the midrange wireless reader device to conduct the transaction.

At block 512, the midrange wireless reader device receives the application file control information associated with the selected AID from the communication device to be written into the transaction service attributes database. At block 514, the midrange wireless reader device may update the application file control information characteristic in the transaction service attributes database with the received application file control information. The midrange wireless reader device may also update the processing options characteristic in the transaction service attributes database based on the received application file control information. For example, if the application file control information requests an unpredictable number, the midrange wireless reader device may generate an unpredictable number or request an unpredictable number from an access terminal, and update the processing options characteristic in the transaction service attributes database with the unpredictable number. The midrange wireless reader device may also update the processing options characteristic in the transaction service attributes database with terminal transaction qualifiers indicating the capabilities of the reader device (e.g., type of transactions the reader device supports, type of authentication such as signature or PIN supported by the reader device, etc.).

Figure 6:
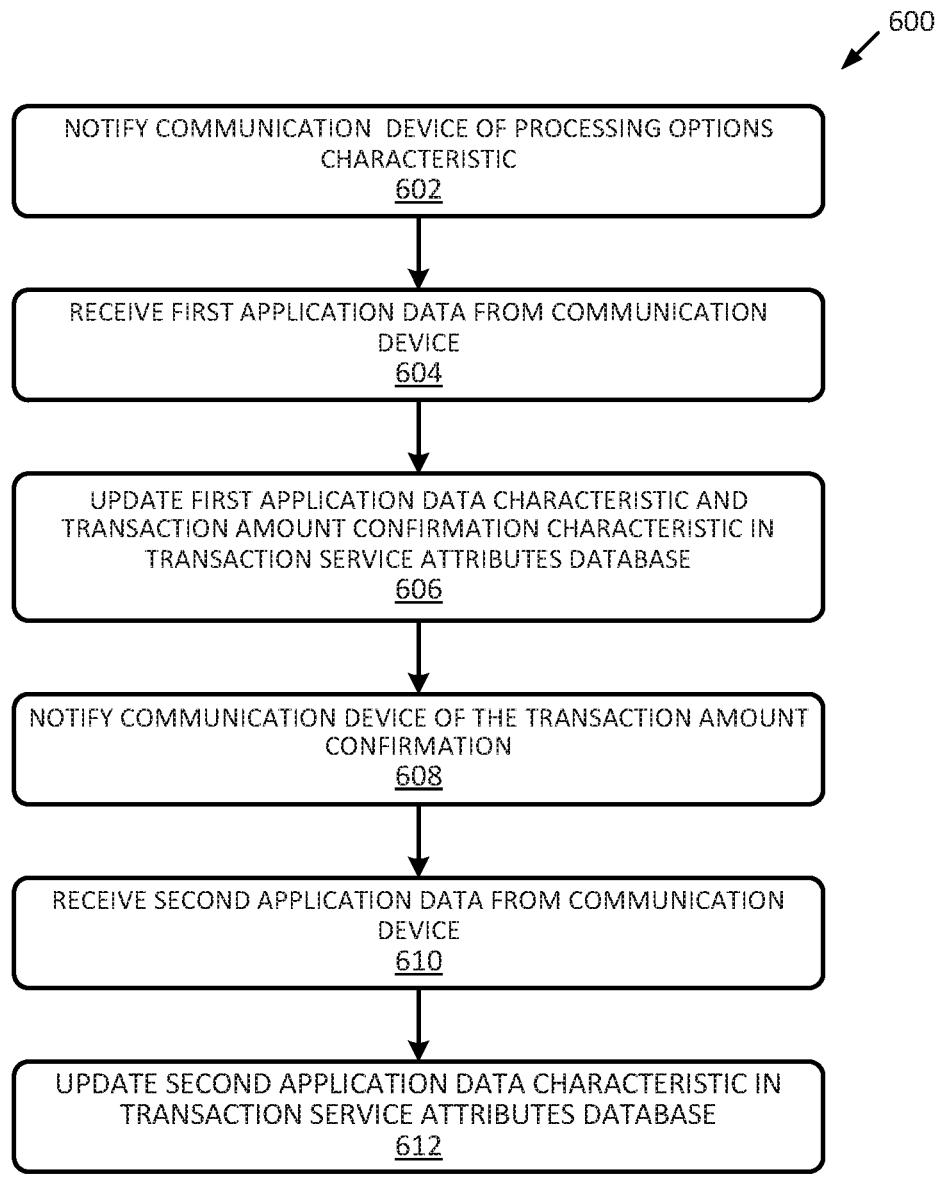
FIG. 6 illustrates a flow diagram of an example application data processing process, according to some embodiments.

Referring back to FIG. 4, once the midrange wireless reader device has updated the processing options characteristic in the transaction service attributes database, process 400 may continue at block 412 to perform application data processing with the communication device. The application data processing may involve updating the transaction service attributes database with application data received from the communication device. FIG. 6 illustrates a flow diagram of an example application data processing process 600, according to some embodiments.

Referring to FIG. 6, the application data processing process 600 may begin at block 602 by the midrange wireless reader device notifying the communication device of the update to the processing options characteristic in the transaction service attributes database, and providing the processing options (e.g., unpredictable number, terminal transaction qualifiers, etc.) to the communication device. In response to receiving the processing options, the communication device may provide to the midrange wireless reader device a first set of application data to be written into the transaction service attributes database.

At block 604, midrange wireless reader device receives the first set of application data from the communication device to be written into the transaction service attributes database. The first set of application data may include an application interchange profile, an account identifier sequence number, an application transaction counter value that is incremented for each transaction conducted with the transaction application, transaction qualifiers indicator whether a customer verification method (e.g., PIN, signature, etc.) is required by the transaction application, customer exclusive data, form factor indicator indicating the form factor of the communication device, issuer country code, and account reference information, etc.

At block 606, in response to receiving the first set of application data, the midrange wireless reader device may update a first application data characteristic in the transaction service attributes database. In some embodiments, the midrange wireless reader device may parse the transaction qualifiers to determine if a customer verification method is required. If so, the midrange wireless reader device may request a PIN, signature, or the appropriate customer verification mechanism from the user. Upon completing the customer verification method if required, the midrange wireless reader device may update a transaction amount confirmation characteristic in the transaction service attributes database with the transaction amount of the transaction.

At block 608, the midrange wireless reader device notifies the communication device of the transaction amount confirmation and provide the transaction amount to the communication device. Upon receiving the transaction amount, the communication device may provide to the midrange wireless reader device a second set of application data to be written into the transaction service attributes database. The second set of application data may include an application cryptogram generated by the communication device, cryptogram information data indicate the type of cryptogram generated, issuer application data, and track 2 equivalent data (which may include an account identifier such as a primary account number, or a token that is a substitute for an real account identifier). The application cryptogram can be generated, for example, by encrypting a combination of data elements including any combination of the unpredictable number, transaction amount as indicated in the transaction amount confirmation, primary account number or token, etc. using a key provisioned to the communication device.

At block 610, the midrange wireless reader device receives the second set of application data from the communication device to be written into the transaction service attributes database. At block 612, in response to receiving the second set of application data, the midrange wireless reader device updates a second application data characteristic in the transaction service attributes database.

Figure 7:
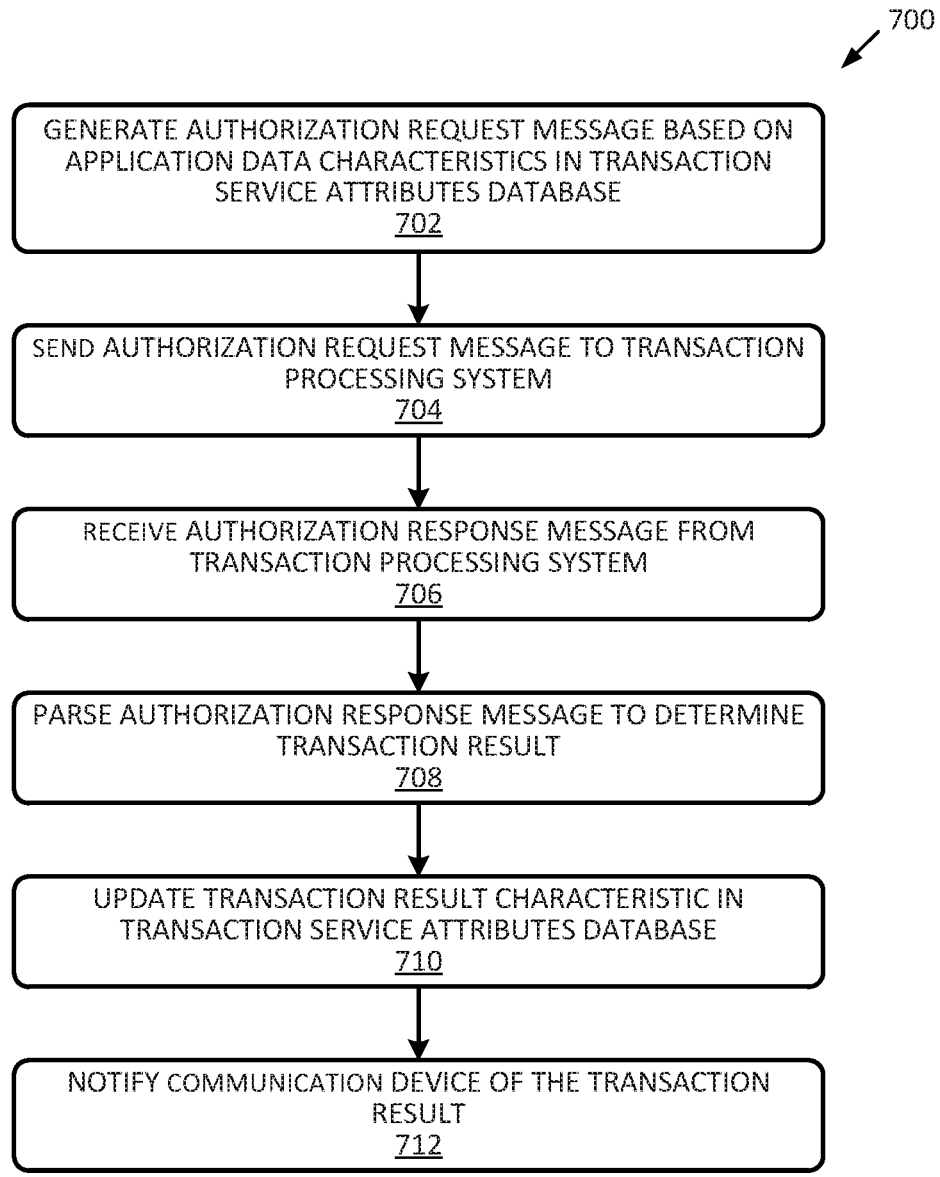
FIG. 7 illustrates a flow diagram of an example authorization request processing process, according to some embodiments.

Referring back to FIG. 4, once the midrange wireless reader device has updated the second application data characteristic in the transaction service attributes database, process 400 may continue at block 414 to perform authorization request processing for the communication device. The authorization request processing may involve generating an authorization request message based on the first and second application data characteristics in the transaction service attributes database. FIG. 7 illustrates a flow diagram of an example authorization request processing process 700, according to some embodiments.

Referring to FIG. 7 the authorization request processing process 700 may begin at block 702 by the midrange wireless reader device generating an authorization request message based on the first and second application data characteristics in the transaction service attributes database. For example, the authorization request message may include at least a portion of the first set of application data and a portion of the second set of application data (e.g., any combination of an authorized transaction amount, the application cryptogram generated by the communication device, application interchange profile, application truncation counter value, account identifier sequence number, customer exclusive data, form factor indicator, issuer application data, terminal entry mode indicating midrange wireless communication is being used to conduct the transaction, terminal country code, terminal entry capability, terminal verification results, transaction currency code, transaction date transaction type, the unpredictable number, and track 2 equivalent data (e.g., account identifier or token), etc.).

At block 704, the authorization request message is sent to a transaction processing system. For example, the midrange wireless reader device may provide the authorization request message to an access terminal for forwarding to an acquirer associated with the merchant. The acquirer may forward the authorization request message to a transaction processing network. In some embodiments, if a token was used in the transaction, the transaction processing network may retrieve the real account identifier associated with the token, and replace the token in the authorization request message with the real account identifier, and forward the modified authorization request message to an issuer to request authorization for the transaction. In some embodiments, the issuer may convert the token to the real account identifier on its own. The issuer may then verify that the real account identifier corresponds to an account in good standing and may regenerate an application cryptogram based on the data elements received in the authorization request message. The transaction can be approved if the regenerated application cryptogram matches the application cryptogram received in the authorization request message. The issuer may then generate an authorization response message with an transaction result indicator to indicate whether the transaction is approved or denied, and send the authorization response message back to the transaction processing network for forwarding to the access terminal and the midrange wireless reader device.

At block 706, the midrange wireless reader device receives the authorization response message from the transaction processing system, and parses the authorization response message at block 708 to determine the transaction result. At block 710, the midrange wireless reader device updates the transaction result characteristic in the transaction service attributes database with the transaction result parsed from the authorization response message. At block 712, the midrange wireless reader device notifies the communication device of the transaction result as to whether the transaction is approved or denied.

Thus far, the communications with a reader device has been described as using a midrange wireless communication technology. In some embodiments, the reader device and/or an access terminal may have the capability to support both a midrange wireless communication technology and a proximity communication technology such as NFC to conduct a transaction. For example, a reader device may have both a midrange wireless transceiver as well as a proximity wireless interface to support NFC. If the reader device and/or access terminal is equipped with both a midrange wireless transceiver and a proximity wireless interface, a transaction can be unintentionally triggered over the midrange wireless communication when it is intended to be performed using proximity communication. If this occurs, the reader device and/or access terminal may power down or disable the midrange wireless transceiver and complete the transaction using the proximity wireless interface.

For example, if a transaction is initiated via the midrange wireless transceiver with a communication device, and prior to completing the transaction, a communication is received on the proximity wireless interface from the communication device to indicate that the transaction is intended to be performed using the proximity wireless interface, the reader device and/or access terminal may purge any data received via the midrange wireless transceiver from the communication device. The reader device and/or access terminal can disable the midrange wireless transceiver to ensure that the transaction will be conducted using the proximity wireless interface. The reader device and/or access terminal may then complete the transaction suing the proximity wireless interface. The midrange wireless transceiver can remain disabled or powered down for the duration of the transaction being conducted using the proximity wireless interface. After the transaction has been completed using the proximity wireless interface, the reader device and/or access terminal may then re-enable the midrange wireless transceiver.

Figure 8:
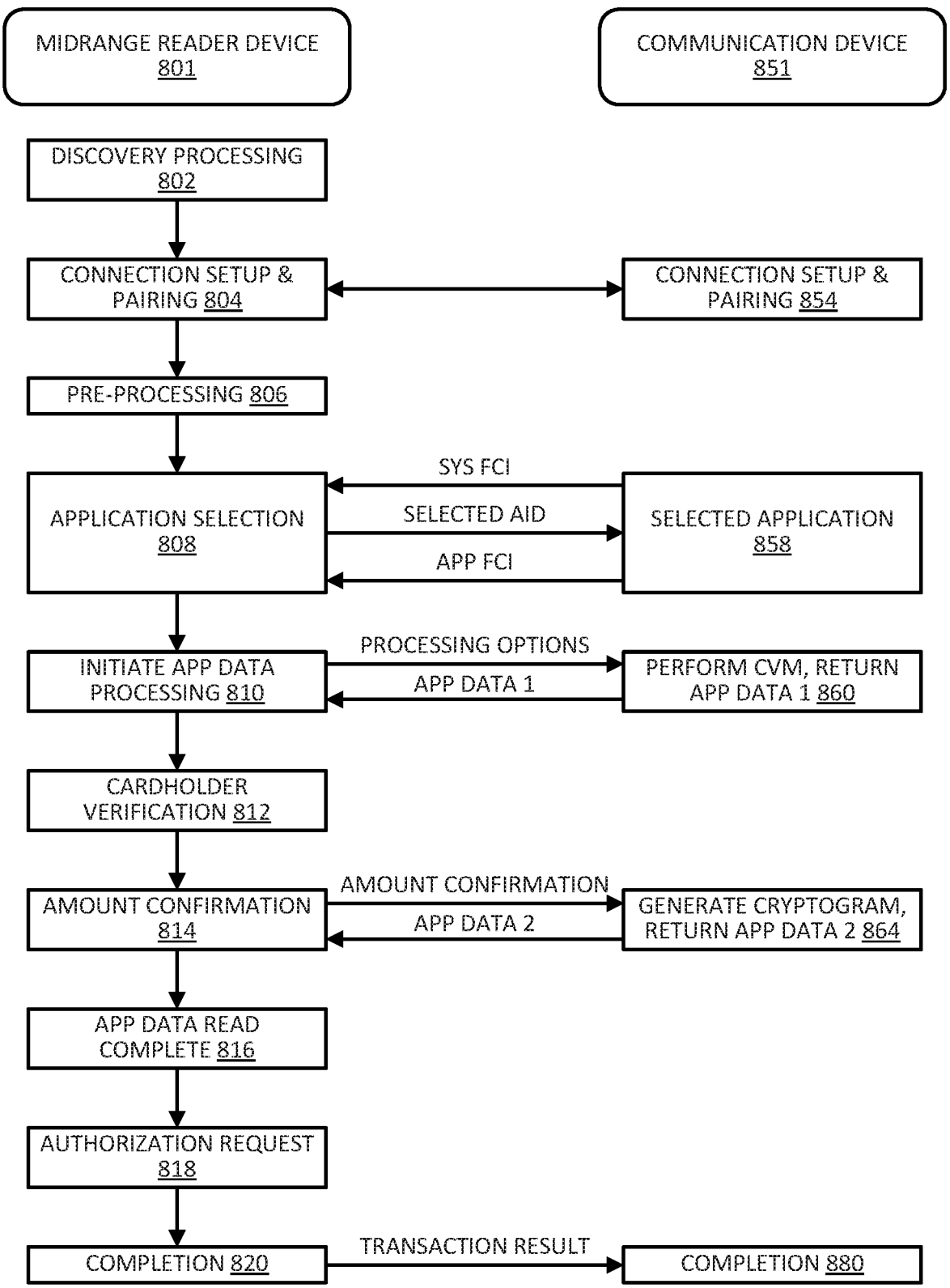
FIG. 8 illustrates a transaction flow between a midrange wireless reader device and a communication device, according to some embodiments.

FIG. 8 illustrates a transaction flow between a midrange wireless reader device 801 and a user's communication device 851, according to some embodiments. Discovery processing 802 is performed by the midrange wireless reader device 801 to advertise its presence to a nearby communication device 851. In some embodiments, the midrange wireless reader device 801 may send connectable undirected advertising events. The advertising events can contain the advertising data and scan response data. The advertising data can include the following: a transaction service UUID and a flag indicating the general discoverable mode. The scan response data can include the local name containing the complete device name of the midrange wireless reader device 801. For a multilane Scenario mentioned above, the complete device name can include both the merchant name and the distinctive descriptor that uniquely identify the purchase lane or station where the midrange wireless reader device 801 is physically located. For a pool scenario mentioned above, the complete device can simply be the merchant name. The midrange wireless reader device 801 can be in general discoverable mode, and be in undirected connectable mode.

Once the midrange wireless reader device 801 receives a connection request, it can attempt to establish a connection with communication device 851 during the connection setup and pairing 804. If the connection is established, a pairing request from communication device 851 can be received to establish keys which can then be used to encrypt the connection. After the midrange wireless reader device 801 receives a connection request from communication device 851, midrange wireless reader device 801 can enter the connected mode and the advertising event can end. When a connection is terminated due to link loss, the midrange wireless reader device 801 can terminate the transaction and return to the advertising mode. If pairing is successful between midrange wireless reader device 801 and communication device 851, the midrange wireless reader device 801 can proceed with the transaction. If pairing fails, a waiting interval can pass before the midrange wireless reader device 801 responds to another pairing request or security request. For each subsequent failure, the wait interval can be increased. If none of the pairing request is successful after waiting interval reaches a predetermined maximum interval, the midrange wireless reader device 801 can terminate the connection.

Pre-processing 806 can be implemented for midrange wireless reader devices that implement variable transaction amounts. The midrange wireless reader device 801 can perform pre-processing to obtain the transaction amount and perform reader risk management. The result of reader risk management is the setting of appropriate bits in the terminal transaction qualifiers (TTQ). Modification of TTQ bits during pre-processing is transient, and does not affect the TTQ value obtained for subsequent transactions. For devices where the transaction amount is a fixed value, TTQ bit settings are already known and need not be determined on a transaction by transaction basis. During pre-processing 806, the midrange wireless reader device 801 can obtain the transaction amount. The acquirer-merchant can have the capability to enable and disable the reader risk parameter check. If the transaction amount is greater than or equal to the reader CVM required limit, then the midrange wireless reader device 801 can indicate that CVM is required.

Application selection 808 is the process of determining which of the applications that are supported by both the communication device 851 and the midrange wireless reader device 801 will be used to conduct the transaction. This process can be performed in two parts: (1) the midrange wireless reader device 801 builds a candidate list of mutually supported applications; and (2) a single application from the candidate list is identified and selected to process the transaction. The midrange wireless reader device 801 may receive system file control information from the communication device 851, and the midrange wireless reader device 801 can parse the system file control information to recover the directory entries of applications available on the communication device 851.

Beginning with the first directory entry, the midrange wireless reader device 801 can sequentially process each directory entry. The midrange wireless reader device 801 can examine the AID of each directory entry. If the AID in the directory entry matches an AID supported by the midrange wireless reader device 801, then the midrange wireless reader device 801 may add the application to the candidate list. The application information added to the candidate list shall include the AID and the application priority indicator (if present). The AID is a match if the AID of the directory entry has the same length and value as the AID supported by the midrange wireless reader device 801 (full match), or if the AID of the directory entry begins with the entire AID supported by the midrange wireless reader device 801 (partial match). If the AID in a directory entry is not coded accordingly, then the midrange wireless reader device 801 can ignore the directory entry.

Once the midrange wireless reader device 801 determines the list of mutually supported applications, it can perform the following procedure to select an application. If there are no mutually supported applications in the candidate list, then the midrange wireless reader device 801 can indicate an error to the user. If there is only one mutually supported application in the candidate list, then the midrange wireless reader device 801 can select that application. If multiple applications are supported in the candidate list, then the midrange wireless reader device 801 can select the application with the highest priority. In the case of multiple candidates with equal priority, the candidates can be selected in the order listed by the system file control information.

The midrange wireless reader device 801 can the send the selected AID to the communication device 851. The selected AID characteristic can contain the AID of the selected application. The midrange wireless reader device 801 may receive the application file control information associated with the selected AID from the communication device 851, and the midrange wireless reader device 801 can parse the application file control information. If the midrange wireless reader device 801 receives the select AID error message from the communication device 851, then the midrange wireless reader device 801 can remove the application from the candidate list and can return to the beginning of selection processing.

Some embodiments can implement support for dynamic reader limits (DRL) functionality. If implemented, DRL functionality can be acquirer-merchant configurable to be enabled or disabled. If enabled, the acquirer-merchant can configure the number of AIDs to use. DRL functionality allows the midrange wireless reader device 801 to apply different reader limit sets for different applications (even if they have the same AID) on the communication device 851, allowing the midrange wireless reader device to vary reader risk parameters on a transaction by transaction basis. For example, a midrange wireless reader device may apply one set of reader risk parameters for domestic transactions, and apply another set of reader risk parameters for international transactions. In some embodiments, the midrange wireless reader device 801 can support a default reader limit set to be used.

During initiate application processing 810, the midrange wireless reader device 801 signals the communication device 851 that transaction processing is beginning. The midrange wireless reader device 801 accomplishes this by sending the data elements that the communication device 851 has requested during application selection 808. The communication device 851 may generate the application cryptogram and returns the application data to the midrange wireless reader device 801.

Prior to initiating the transaction with the communication device 851, the midrange wireless reader device 801 may generate an unpredictable number. The midrange wireless reader device 801 can perform the following procedure to initiate the transaction with the communication device 851. The midrange wireless reader device 801 can send processing options to the communication device 851. The processing options can contain a data object coded according to the request included in the application file control information provided from the communication device 851. When the midrange wireless reader device 801 receives the first set of application data from the communication device 851, the midrange wireless reader device 801 can determine if a cardholder verification method (CVM) is to be performed, and perform the cardholder verification 812 if required.

After the cardholder verification 812 is complete, the midrange wireless reader device 801 may send the information necessary for the user to confirm payment to the communication device 851. The midrange wireless reader device 801 can send the transaction amount confirmation 814, the merchant name, and optional merchant proprietary data to the communication device 851. When the midrange wireless reader device 801 receives the second set of application data, the midrange wireless reader device 801 can proceed with the transaction.

After the midrange wireless reader device 801 recover the application data in both sets of application data, the midrange wireless reader device 801 can check the data elements during application data read completion 816 to ensure that all data for the transaction has been returned, and that redundant primitive data was not returned. Primitive data elements are redundant if more than one occurrence of the primitive data element was returned during initiate application processing 810. The midrange wireless reader device 801 examines the application data to determine whether all required data elements were returned, and whether redundant primitive data elements were returned. The midrange wireless reader device 801 can ensure that all mandatory data elements are returned by the communication device 851. If any mandatory data elements are not present, then the midrange wireless reader device 801 can terminate the transaction. If the midrange wireless reader device 801 encountered more than one occurrence of a single primitive data element in the application data, the midrange wireless reader device 801 may also terminate the transaction.

The midrange wireless reader device 801 may then send an authorization request 818 to the issuer host. Online processing allows the issuer host to review and authorize or decline transactions using the issuer's host based risk management parameters. For example, the midrange wireless reader device 801 can send an online authorization request message to the acquirer.

The midrange wireless reader device 801 can then perform the completion procedure 820 to complete the transaction. When online processing is performed and an authorization response message is received, the midrange wireless reader device 801 can proceed with approving or declining the transaction based upon the authorization response. When online processing is not performed (or performed and an authorization response message is not received), the midrange wireless reader device 801 can examine internal reader transaction disposition indicators to determine subsequent processing. For approved transactions, the midrange wireless reader device 801 can set the value of transaction result to approved, and send it to the communication device 851. The midrange wireless reader device 801 can indicate to the merchant that the transaction has been approved. For declined transactions, the midrange wireless reader device 801 can set the value of transaction result to declined, and send it to the communication device 851. The midrange wireless reader device 801 can indicate to the merchant that the transaction has been declined. Once the transaction is completed and the supported value added services are completed, the midrange wireless reader device 801 can terminate the connection and returns to the discovery processing 802.

The above description is illustrative and is not restrictive. Many variations of the various embodiments may become apparent to those skilled in the art upon review of the disclosure. The scope of the invention may, therefore, be determined not with reference to the above description, but instead may be determined with reference to the pending claims along with their full scope or equivalents.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

It may be understood that some embodiments as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A system comprising:
a plurality of access terminals communicatively coupled to a plurality of reader devices, wherein each of the plurality of access terminals are communicatively coupled to each of the plurality of reader devices, wherein the number of the plurality of reader devices is less than the number of the plurality of access terminals, and wherein the plurality of reader devices are shared amongst the plurality of access terminals; and
the plurality of reader devices, each reader device including:
a midrange wireless transceiver;

a controller coupled to the midrange wireless transceiver; and a memory coupled to the controller, the memory storing executable code, which when executed by the controller, causes the controller to perform operations including:

maintaining transaction service attributes at the reader device, the transaction service attributes including a set of transaction service characteristics including a selected application identifier characteristic, an application data characteristic, and a transaction amount confirmation characteristic, wherein the set of transaction service characteristics are transient;

broadcasting a beacon at a periodic interval using the midrange wireless transceiver, the beacon including a transaction service indicator, each reader device using the same transaction service indicator, and wherein only one of the plurality of reader devices at a time performs the broadcasting the beacon at the periodic interval;

receiving a connection request from a communication device via the midrange wireless transceiver;

in response to receiving the connection request from the communication device, establishing a wireless connection with the communication device via the midrange wireless transceiver and ending the broadcasting the beacon, wherein, after the wireless connection with the communication device is established, a next reader device from the plurality of reader devices starts broadcasting the beacon;

performing an application selection process with the communication device by updating the selected application identifier characteristic in the transaction service attributes based on file control information received from the communication device via the midrange wireless transceiver;

performing application data processing with the communication device by updating the application data characteristic and the transaction amount confirmation characteristic in the transaction service attributes with application data received from the communication device via the midrange wireless transceiver, the application data including an application cryptogram; and performing authorization request processing for the communication device, the authorization request processing including generating an authorization request message based on the application data in the transaction service attributes and sending, using one of the plurality of access terminals, the authorization request message to a transaction processing system.

2. The system of claim 1, wherein the application selection process includes:

receiving system file control information from the communication device;

updating a system file control information characteristic in the transaction service attributes based on the received system file control information;

selecting an application identifier based on the system file control information; and updating the selected application identifier characteristic in the transaction service attributes with the selected application identifier.

3. The system of claim 2, wherein the application selection process further includes:

notifying the communication device of the selected application identifier characteristic;

receiving application file control information associated with the selected application identifier from the communication device; and updating an application file control information characteristic and a processing options characteristic in the transaction service attributes based on the received application file control information.

4. The system of claim 3, wherein the application data processing includes:

notifying the communication device of the processing options characteristic;

receiving first application data from the communication device;

in response to receiving the first application data, updating a first application data characteristic and the transaction amount confirmation characteristic in the transaction service attributes;

notifying the communication device of the transaction amount confirmation;

receiving second application data from the communication device to be written into the transaction service attributes; and in response to receiving the second application data, updating a second application data characteristic in the transaction service attributes.

5. The system of claim 4, wherein the first application data includes an application transaction counter value.

6. The system of claim 1, wherein the application cryptogram is an encrypted combination of a transaction amount and an unpredictable number and a token.

7. The system of claim 4, wherein the authorization request processing includes:

wherein the sending of the authorization request message includes sending at least a portion of the first application data and a portion of the second application data;

receiving, using the one of the plurality of access terminals, an authorization response message from the transaction processing system;

parsing the authorization response message;

determining a transaction result based on the parsing of the authorization response message;

updating a transaction result characteristic in the transaction service attributes with the transaction result; and notifying the communication device of the transaction result.

8. The system of claim 1, wherein the operations further include:

receiving a scan response request from the communication device; and sending scan response data to the communication device, the scan response data including a device name of the reader device.

9. The system of claim 1, further comprising:

a proximity wireless interface, wherein the operations further include:

initiating a second transaction via the midrange wireless transceiver with a second communication device;

prior to completing the second transaction, receiving a communication on the proximity wireless interface from the second communication device;

purging data received via the midrange wireless transceiver from the second communication device;

disabling the midrange wireless transceiver;

completing the second transaction using the proximity wireless interface; and re-enabling the midrange wireless transceiver after completing the second transaction.

10. The system of claim 8, wherein the device name of the reader device is the same for each of the plurality of reader devices.

11. The system of claim 10, wherein the device name of the reader device is a merchant name of a merchant, and wherein each of the plurality of access terminals are associated with the merchant.

12. The system of claim 1, wherein the transaction service indicator is a universally unique identifier (UUID).

13. A method comprising:

maintaining, by a reader device in a system including a plurality of reader devices communicatively coupled to a plurality of access terminals, transaction service attributes at the reader device, the transaction service attributes including a set of transaction service characteristics including a selected application identifier characteristic, an application data characteristic, and a transaction amount confirmation characteristic, wherein the set of transaction service characteristics are transient, wherein each of the plurality of access terminals are communicatively coupled to each of the plurality of reader devices, wherein the number of the plurality of reader devices is less than the number of the plurality of access terminals, and wherein the plurality of reader devices are shared amongst the plurality of access terminals;

broadcasting, by the reader device, a beacon at a periodic interval using a midrange wireless transceiver, the beacon including a transaction service indicator, wherein each reader device of the plurality of reader devices uses the same transaction service indicator, and wherein only one of the plurality of reader devices at a time performs the broadcasting the beacon at the periodic interval;

receiving, by the reader device, a connection request from a communication device via the midrange wireless transceiver;

in response to receiving the connection request from the communication device, establishing, by the reader device, a wireless connection with the communication device and ending the broadcasting the beacon, wherein, after the wireless connection with the communication device is established, a next reader device from the plurality of reader devices starts broadcasting the beacon;

performing, by the reader device, an application selection process with the communication device by updating the selected application identifier characteristic in the transaction service attributes based on file control information received from the communication device via the midrange wireless transceiver;

performing, by the reader device, application data processing with the communication device by updating the application data characteristic and the transaction amount confirmation characteristic in the transaction service attributes with application data received from the communication device via the midrange wireless transceiver, the application data including an application cryptogram; and performing, by the reader device, authorization request processing for the communication device by generating an authorization request message based on the application data in the transaction service attributes and sending, using one of the plurality of access terminals, the authorization request message to a transaction processing system.

14. The method of claim 13, wherein the application selection process includes:

receiving system file control information from the communication device to be written into the transaction service attributes;

updating a system file control information characteristic in the transaction service attributes based on the received system file control information;

selecting an application identifier based on the system file control information; and updating the selected application identifier characteristic in the transaction service attributes with the selected application identifier.

15. The method of claim 14, wherein the application selection process further includes:

notifying the communication device of the selected application identifier characteristic;

receiving application file control information associated with the selected application identifier from the communication device to be written into the transaction service attributes; and updating an application file control information characteristic and a processing options characteristic in the transaction service attributes based on the received application file control information.

16. The method of claim 15, wherein the application data processing includes:

notifying the communication device of the processing options characteristic;

receiving first application data from the communication device to be written into the transaction service attributes;

in response to receiving the first application data, updating a first application data characteristic and a transaction amount confirmation characteristic in the transaction service attributes;

notifying the communication device of the transaction amount confirmation;

receiving second application data from the communication device to be written into the transaction service attributes; and in response to receiving the second application data, updating a second application data characteristic in the transaction service attributes.

17. The method of claim 13, wherein the application cryptogram is generated by encrypting a transaction amount in combination with an unpredictable number and a token.

18. The method of claim 16, wherein the authorization request processing includes:

wherein the sending of the authorization request message includes sending at least a portion of the first application data and a portion of the second application data;

receiving, using the one of the plurality of access terminals, an authorization response message from the transaction processing system;

parsing the authorization response message to determine a transaction result;

updating a transaction result characteristic in the transaction service attributes with the transaction result; and notifying the communication device of the transaction result.

19. The method of claim 14, further comprising:

receiving a scan response request from the communication device; and sending scan response data to the communication device, the scan response data including a device name of the reader device, wherein the device name of the reader device is the same for each of the plurality of reader devices.

20. The method of claim 14, wherein the transaction service indicator is a universally unique identifier (UUID).

* * * * *